(12) United States Patent
Dong

(10) Patent No.: US 8,528,592 B2
(45) Date of Patent: Sep. 10, 2013

(54) CHECK VALVE CONSTRUCTION

(75) Inventor: Zhenxing Dong, Brighton, MA (US)

(73) Assignee: Idex Health & Science, LLC, Middleboro, MA (US)

( * ) Notice: Subject to any disclaimer, the term of this patent is extended or adjusted under 35 U.S.C. 154(b) by 398 days.

(21) Appl. No.: 12/932,493

(22) Filed: Feb. 28, 2011

(65) Prior Publication Data

US 2012/0216884 A1    Aug. 30, 2012

(51) Int. Cl.
*F16K 15/04*     (2006.01)

(52) U.S. Cl.
USPC ................ 137/512; 137/533.11; 417/568

(58) Field of Classification Search
USPC .............. 137/512, 533.11, 533.13, 533.15; 417/568
See application file for complete search history.

(56) References Cited

U.S. PATENT DOCUMENTS

| | | | | |
|---|---|---|---|---|
| 3,649,139 A | * | 3/1972 | Thompson | 417/568 |
| 3,981,620 A | * | 9/1976 | Abrahams et al. | 417/568 |
| 4,086,936 A | * | 5/1978 | Vork | 137/533.11 |
| 4,773,833 A | * | 9/1988 | Wilkinson et al. | 417/568 |
| 4,778,347 A | * | 10/1988 | Mize | 417/568 |
| 5,002,662 A | * | 3/1991 | Ledtje et al. | 137/533.11 |
| 5,094,596 A | * | 3/1992 | Erwin et al. | 417/568 |
| 6,305,420 B1 | * | 10/2001 | Atkinson et al. | 137/533.11 |
| 7,766,034 B2 | * | 8/2010 | Talaski | 137/533.11 |

* cited by examiner

*Primary Examiner* — John Rivell

(57) ABSTRACT

A check valve construction is provided in which a moveable a movable ball having a convex surface resides in a cage having a conical frustum chamber and a seat for the ball. A fluid path between the ball and the cage is defined by the equation:

$$G = \frac{D\cos(b-a)}{2\cos b} - \frac{d}{2}$$

wherein
G is the gap of the narrowest passageway of the fluid path,
D is the diameter of the small end of the conical frustum chamber of the cage,
d is the diameter of the convex surface of the ball,
a is the angle between a vertical diameter of the ball and the position of the narrowest gap on the convex surface of the ball, and,
b is the angle between the vertical diameter of the movable element and the position of the small end of conical frustum chamber of the cage.

6 Claims, 6 Drawing Sheets

CHECK VALVE CONSTRUCTION

BACKGROUND OF THE INVENTION

This invention relates to a check valve construction for a fluid delivery system useful for dispensing precise volumes of fluid.

Prior to the present invention, fluid delivery systems have been available which minimize system volume and which minimize intermixing of fluids while delivering a precise amount of a fluid for use such as in a chemical reaction. These systems generally are utilized for chemical processes such as diagnosis or analytical apparatus or for processes that involve a large number of sequentially effected chemical reactions such as in protein synthesis, deoxyribonucleic acid (DNA) synthesis or when sequencing proteins.

Check valves that permit fluid flow in only one direction are commonly utilized in fluid delivery systems to effect delivery of discrete fluid volumes sequentially from a fluid reservoir to a point of use. When utilizing such fluid delivery systems, it is desirable to minimize conditions, which may result in variation in volume of the discrete fluid samples being delivered. In order to minimize such volume variations, it is desirable that the check valve have a quick response to changes in pressure, a large hydraulic force applied to the movable portion of the check valve such as a ball or disc, and that the movable portion does not chatter or slam when moved. In addition, it is desirable that the check valve have a low internal volume for high performance fluid delivery systems.

Accordingly, it would be desirable to provide a check valve and a fluid delivery system which utilizes a check valve construction which reduces back pressure within the valve thereby reducing the pressure needed to move the movable portion of the valve and to provide a quick response time for opening or closing the valve.

SUMMARY OF THE INVENTION

In accordance with this invention, a check valve construction and system utilizing the valve are provided. The check valve construction has two independent movable elements each of which functions to open or close a fluid passageway. The movable elements fit within a seat, which is shaped to permit fluid communication between a leading surface and a rearward surface of the movable element when it is in the open position. This fluid communication functions both to permit fluid flow around the movable element and to reduce back pressure on the rearward surface of the movable element. This reduced back pressure permits the movable element to be moved more quickly between the open position and the closed position for a given pressure on the elements.

DESCRIPTION OF SPECIFIC EMBODIMENTS

Figure 1A:
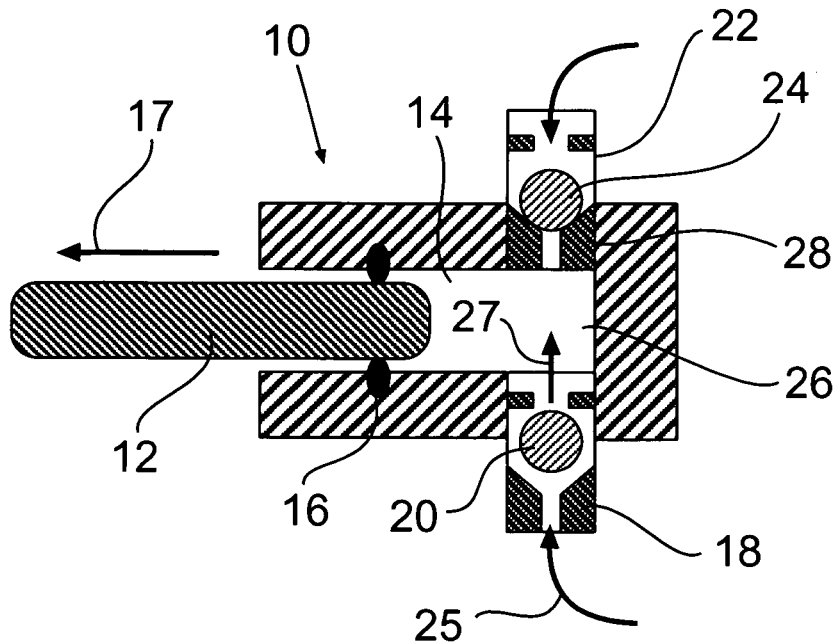
FIG. 1A is a schematic diagram of a fluid delivery system in a fluid fill position of this invention.

Referring to FIG. 1A, a fluid delivery system that utilizes the check valve construction of this invention is shown in fluid fill position. The fluid delivery system 10 includes a pump having a piston 12 positioned in a cylinder 14 with a seal 16. The direction of movement of the piston 12 is shown by arrow 17. With this piston movement, valve 18 having ball 20 is open and valve 22 having ball 24 is closed. Valve 18 is connected to a fluid reservoir (not shown). Valve 22 is connected to a point of use (not shown). When the piston is moved in direction 17, the cylinder 26 is filled with fluid from the fluid reservoir as indicated by arrows 25 and 27 and the fluid is prevented from flowing to the point of use. Prevention of fluid flow to a point of use is effected by ball 24 being positioned in slot 28.

Figure 1B:
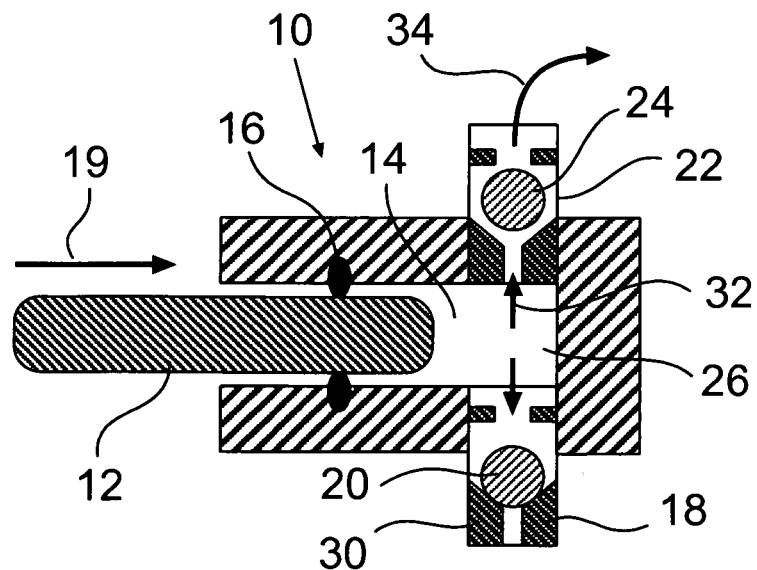
FIG. 1B is a schematic diagram of a fluid delivery system in a fluid delivery position of this invention.

Referring to FIG. 1B, the fluid delivery system of FIG. 1A is shown in the fluid delivery position. The piston 12 is moved in the direction of arrow 19. With this piston movement, valve 18 is closed by virtue of ball 20 being positioned in seat 30 and valve 22 is open. Fluid flow to a point of use is indicated by arrows 32 and 34. The cycles described above are repeated by moving the piston 12 as described above.

The invention will be described below with reference to a movable element comprising a ball or a disc. In accordance with this invention, the gap and position of a narrow passageway between either the ball and the ball cage or the disc and the disc seat is controlled to reduce back pressure on the ball or disc.

Figure 3:
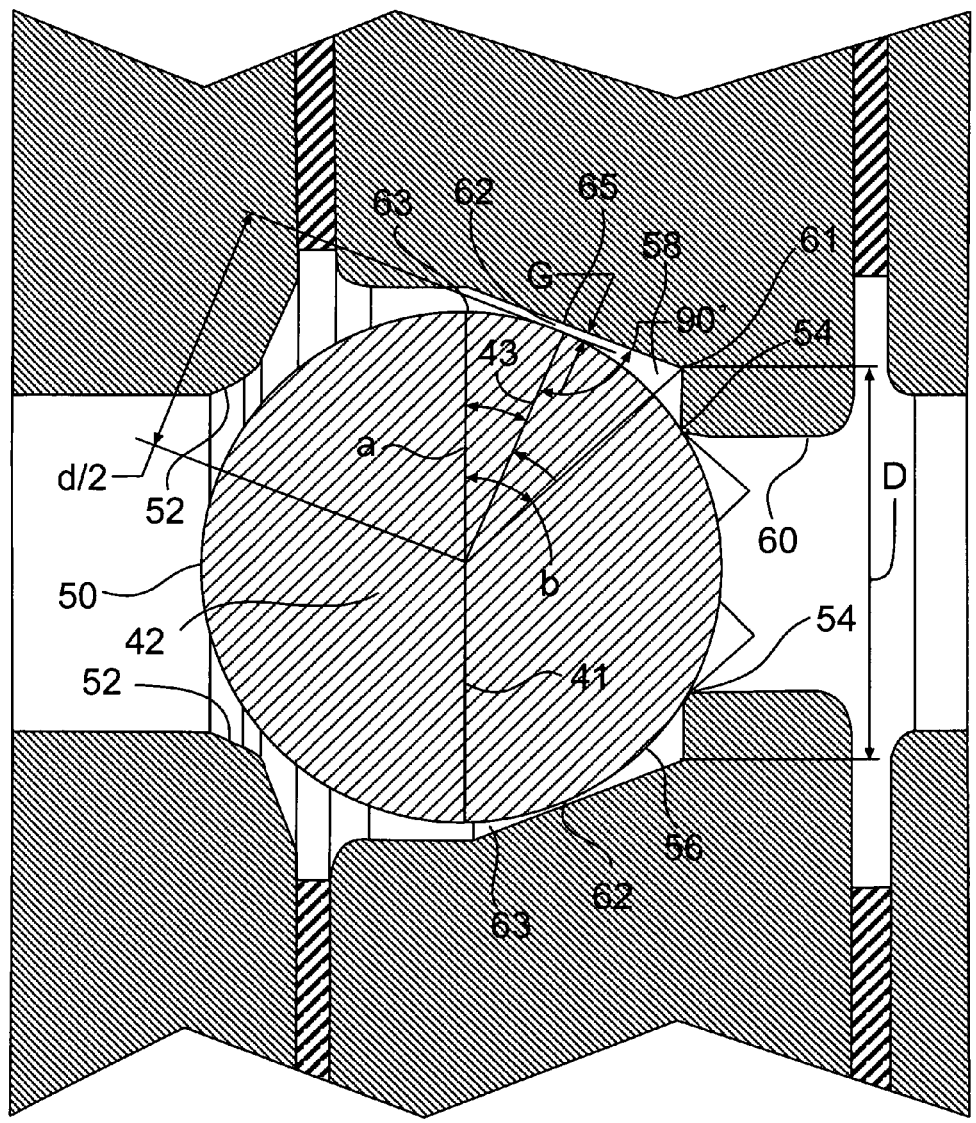
FIG. 3 is a close-up cross section of a ball check valve of this invention in an open position.

Referring to FIG. 3, the passageway for the ball has a most narrow passageway 62, comprised of the ball 42 and the conical frustum chamber 63 positioned at an angle (a) between about 15 degrees and about 25 degrees, preferably between about 18 and about 22 degrees and most preferably 20 degrees from the vertical diameter 41 of the ball 42 and from the radius 43 of the ball extending to the narrow passageway 62. The angle (a) is equal to the slope angle of conical frustum chamber 63 of the ball cage. The small end 61 of the conical frustum chamber 63 of the ball cage is positioned at angle (b) from the vertical diameter 41 of the ball 42. The narrowest passageway 62 produces the desired backpressure on the ball 42. The gap (G) of the narrowest passageway 62, when the check valve is in the full open position is defined by the following equation:

$$G = \frac{D\cos(b-a)}{2\cos b} - \frac{d}{2}$$

Where:
D: diameter of the small end of conical frustum chamber of the ball cage
d: diameter of the ball
a and b are as above The gap of the narrow passageway 62 depends on the desired flow rate. The ideal gap permits obtaining the desired flow rate when the check valve is in the full open position.

Figure 2:
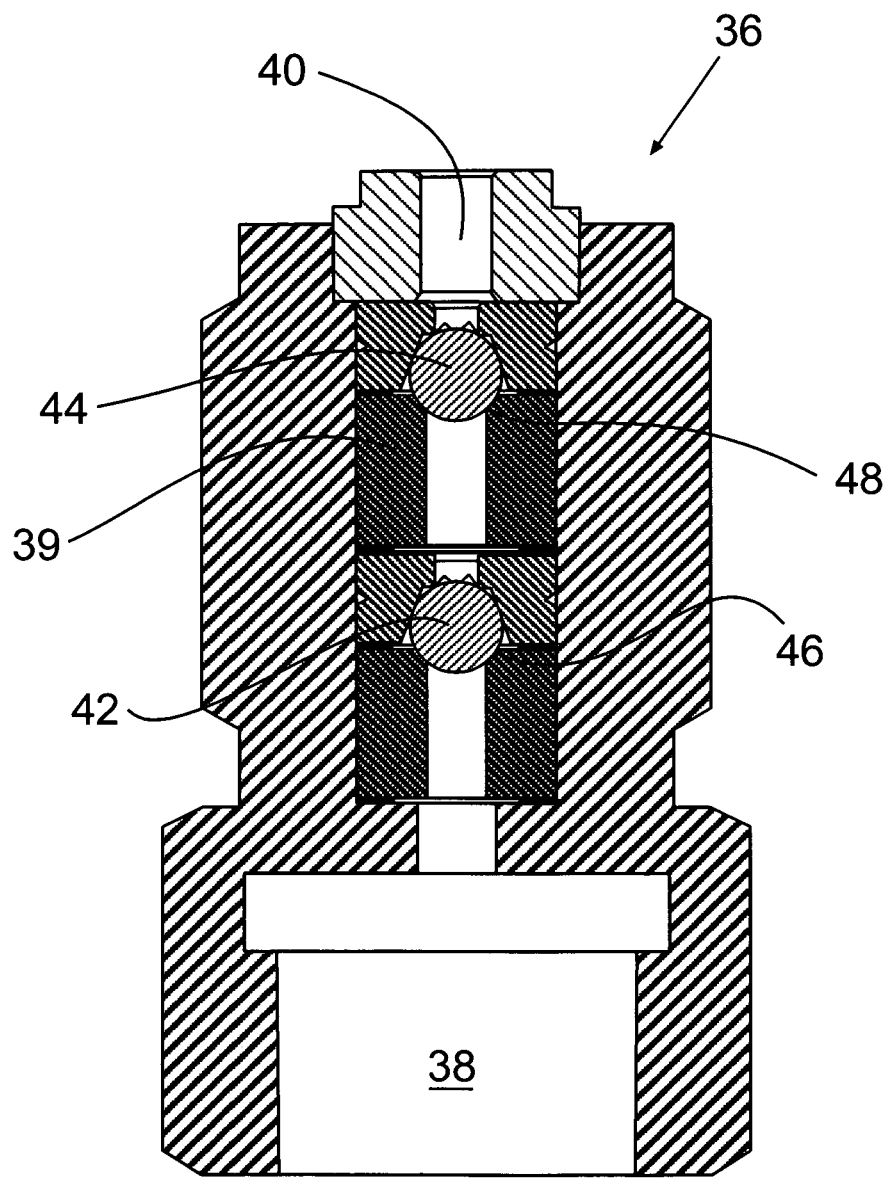
FIG. 2 is a cross section of a fluid delivery system of this invention with a pump (not shown).

Referring to FIG. 2, the check valve 39 includes a fluid feed passageway 38 in fluid communication with a pump (not shown) and a fluid delivery passageway 40 in fluid communication with a point of use (not shown). A check valve of this invention is positioned between passageways 38 and 40 and comprises two balls 42 and 44; each positioned within a seat 46 or 48.

Figure 5:
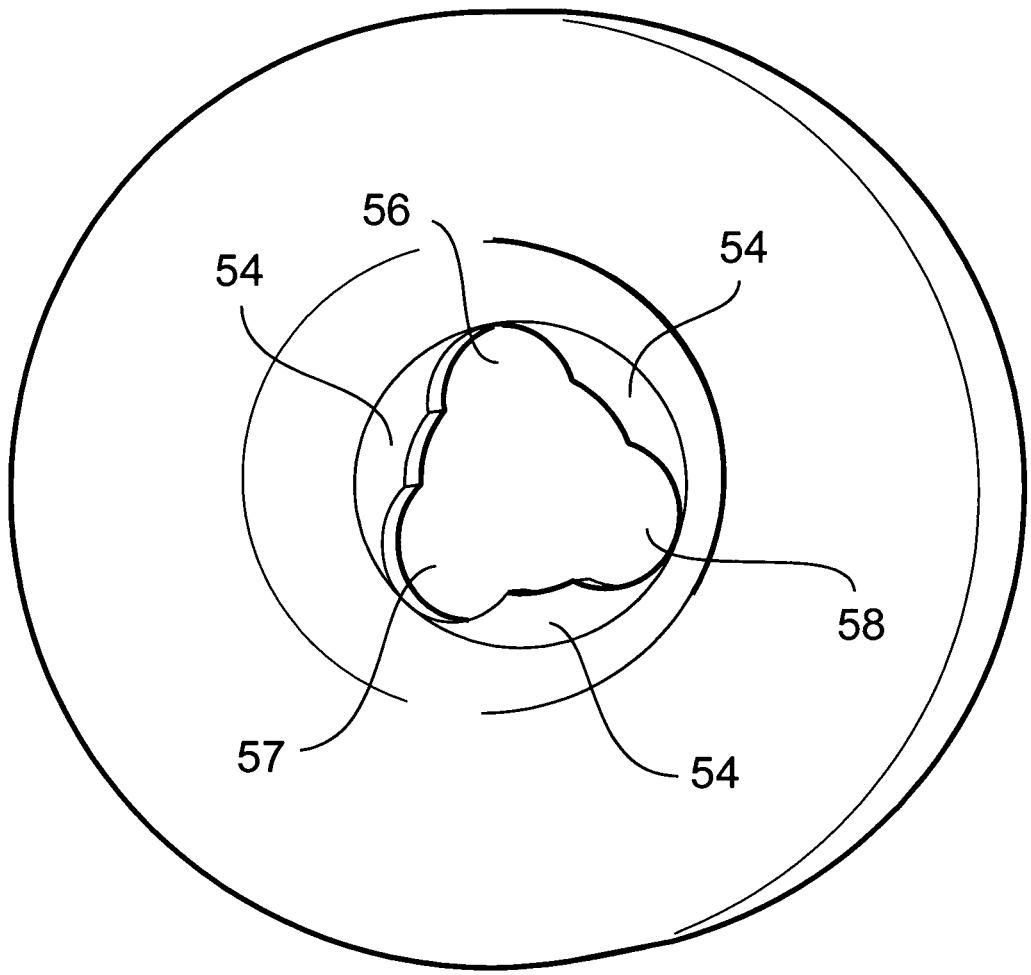
FIG. 5 is an isometric view of a valve seat utilized with the check valve of FIGS. 3 and 4.
Figure 6:
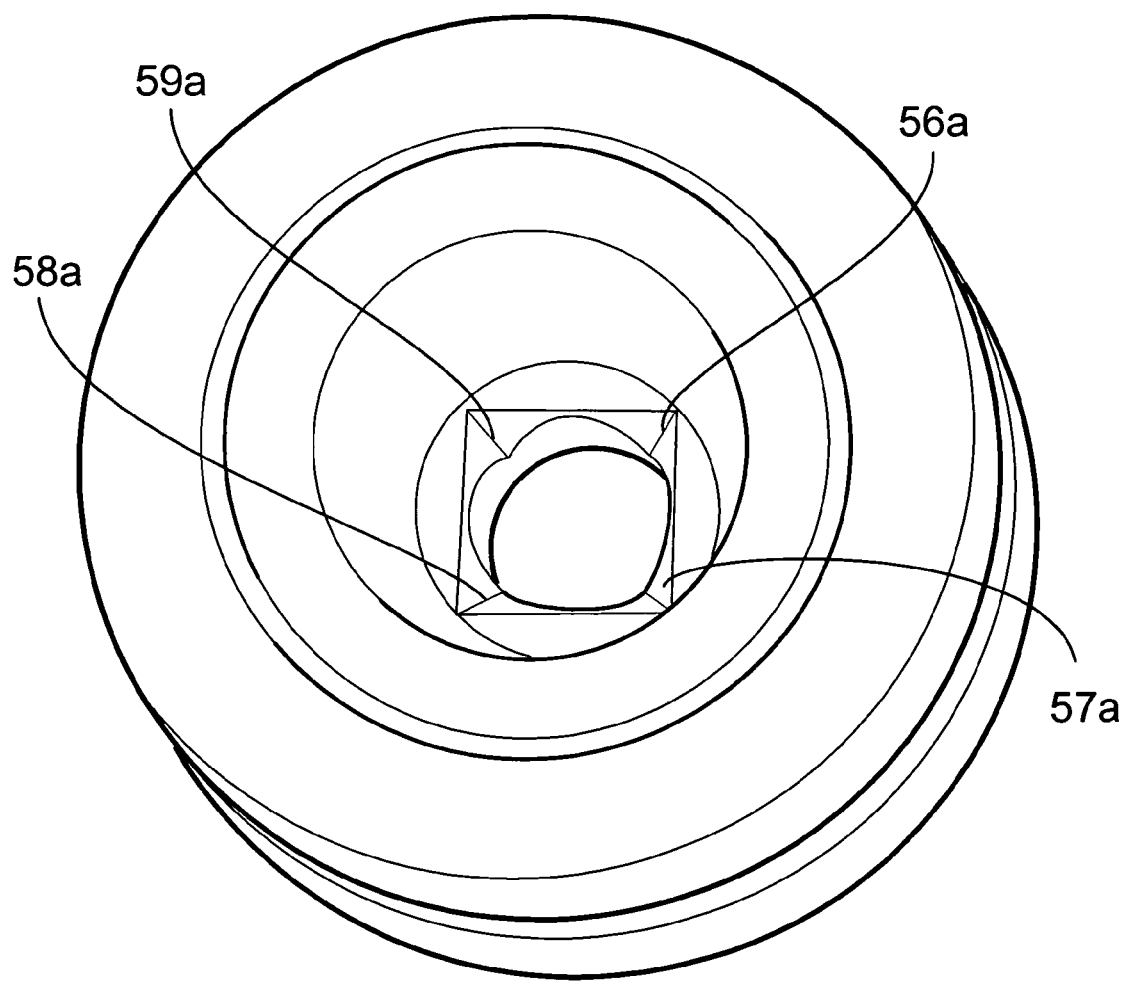
FIG. 6 is an isometric view of an alternative valve seat that can be utilized with the check valve of FIGS. 3 and 4.

The full open position for the balls 42 and 44 of check valve 39 is shown in FIG. 3. Elevated pressure is exerted on surface 50 of the ball 42 by the pump (not shown) to remove ball 42 from seat 52 and to position the ball 42 in ball cage 54. When ball 42 is positioned in ball cage 54, ball 42 reaches the full open position and is stopped by the ball cage 54. Passageways 56, 57 and 58 (FIG. 5) permit fluid flow into fluid delivery passageway 60. Passageways 56, 57 and 58 each have a narrow passageway 62 defined as set forth above. Ball 44 is positioned in the same manner as described above for ball 42 in the full open position. An alternative cage construction for the ball in the full open position is shown in FIG. 6 wherein four passageways 56a, 57a, 58a and 59a are shown. When ball 42 is in the open position, ball 44 (FIG. 2) also is in the open position shown.

Figure 4:
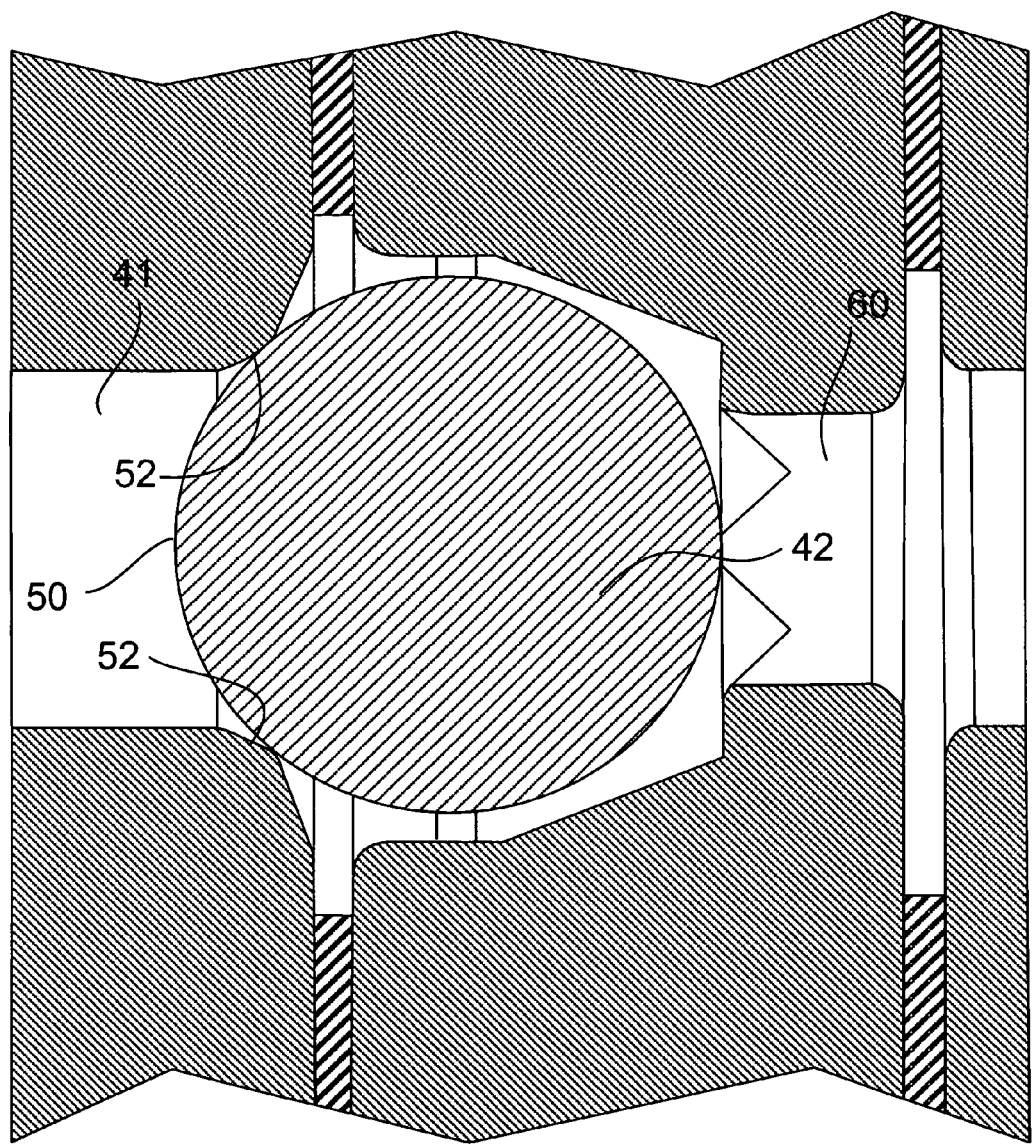
FIG. 4 is a close-up cross section of a ball check valve of this invention in a closed position.

Referring to FIG. 4, the ball 42 is shown in the closed position when it contacts seat 52 thereby to prevent fluid flow from fluid delivery passageway 60. Positioning ball 42 in seat 52 is effected by reducing pressure on surface 50 by a pump (not shown) in fluid communication with fluid feed conduit 41.

The invention claimed is:

1. A check valve construction which comprises:
   a movable ball having a convex surface,
   a cage having a conical frustum chamber for said ball,
   a seat for said ball,
   a fluid path between said ball and said cage defined by the equation:

$$G = \frac{D\cos(b-a)}{2\cos b} - \frac{d}{2}$$

wherein
   G is the gap of the narrowest passageway of the fluid path,
   D is the diameter of the small end of the conical frustum chamber of the said cage,
   d is the diameter of the convex surface of said ball,
   a is the angle between a vertical diameter of said ball and the position of the narrowest gap on the convex surface of said ball, and
   b is the angle between the vertical diameter of the movable ball and the position of the small end of conical frustum chamber of said cage.

2. The check valve construction of claim 1 wherein the angle between the vertical diameter of the ball and the position of the narrowest gap of the convex surface of the ball is between about 18 and about 22 degrees.

3. The check valve construction of claim 1 wherein the angle between the vertical diameter of the ball and the position of the narrowest gap of the convex surface of the ball is between about 15 and about 25 degrees.

4. A fluid delivery system including two of the check valves of claim 1, a fluid inlet into said check valves and a fluid outlet from said check valves.

5. A fluid delivery system including two of the check valves of claim 2, a fluid inlet into said check valves and a fluid outlet from said check valves.

6. A fluid delivery system including two of the check valves of claim 3, a fluid inlet into said check valves and a fluid outlet from said check valves.

* * * * *